United States Patent Office 2,872,445
Patented Feb. 3, 1959

2,872,445

PROCESS FOR THE PRODUCTION OF CYANURIC CHLORIDE

Adolf von Friedrich, Karl-Heinz Legrand, Paul Schmitz, and Hermann Holzrichter, Leverkusen-Bayerwerk, Germany, assignors to Farbenfabriken Bayer Aktiengesellschaft, Leverkusen, Germany, a corporation of Germany No Drawing. Application December 14, 1955
Serial No. 552,978

Claims priority, application Germany December 24, 1954

8 Claims. (Cl. 260—248)

The present invention relates to a process for the production of cyanuric chloride.

Various processes have already been proposed for the preparation of cyanuric chloride by polymerisation of cyanogen chloride, and these processes can be divided into two groups, namely, those in which the polymerisation is carried out in the liquid phase, and those in which the polymerisation takes place in the gaseous phase. All these processes have certain disadvantages. It can generally be stated that when operating in the liquid phase under the conditions formerly employed, the reaction velocity is unsatisfactory, while a gradual decrease in the activity of the catalyst employed is troublesome when operating in the gaseous phase.

It is an object of the present invention to provide a novel process for the production of cyanuric chloride by polymerisation of cyanogen chloride in a technical scale. A further object is to provide cyanuric chloride in a process with a high reaction velocity. Still another object is to avoid in this process the use of a catalyst. Other objects will appear hereinafter.

These objects are attained in accordance with the present invention by carrying out the polymerisation of the cyanogen chloride in liquid cyanuric chloride as a solvent and at a temperature higher than 200° C. preferably in the range of 250 to 400° C. The pressure in the reaction vessel under the said conditions corresponds to the vapour pressure of the liquid cyanuric chloride at the reaction temperature employed, that is, generally about 10 to 15 atmospheres.

The process according to the invention can be carried out, for example by introducing liquid cyanogen chloride by means of a suitable pump into cyanuric chloride which is in a pressure vessel at a temperature higher than 200° C. Evaporation and dissolution of the cyanogen chloride takes place immediately as the liquid cyanogen chloride enters the hot liquid cyanuric chloride, which is under its own vapour pressure in the reaction vessel. The dissolved cyanogen chloride is polymerised almost instantaneously in the hot liquid cyanuric chloride, heat being liberated. Some of this heat is taken up by the vaporisation of the liquid cyanogen chloride; the remainder must be dissipated by cooling.

A sufficiently thorough mixing is generally produced simply by the introduction of the cyanogen chloride into the liquid cyanuric chloride, but this can if necessary be further improved by stirring and/or other suitable measures.

Owing to the formation of cyanuric chloride in the reaction vessel, the level of the cyanuric chloride is constantly raised in the said vessel. The cyanuric chloride which is formed must therefore be removed at intervals or continuously. It has proved to be advantageous for the cyanuric chloride to be initially discharged from the reaction vessel into an intermediate vessel, where it is cooled in the liquid condition to a temperature lower than 200° C. The cyanuric chloride is then expanded from this intermediate vessel into a receiver at atmospheric pressure. The reason for carrying out this intermediate cooling is to avoid clogging of the outlet valve, which would occur if the cyanuric chloride were expanded continuously at a temperature higher than 200° C., owing to partial evaporation of the cyanuric chloride and the resulting deposition of solid secondary products. A vessel which is suitable as a reaction vessel for carrying into effect the process according to the present invention is a vertically disposed tube or a cylindrical pressure vessel made of refined steel. A separate intermediate vessel is not necessary if provision is made for the reaction product to be cooled after leaving the mixing and reaction zone and prior to being allowed to expand.

Since the polymerisation takes place practically instantaneously under the reaction conditions, the yield per unit of volume and time which can be produced by means of the novel process is dependent only on the efficiency of the mixing and the cooling action for dissipating the heat of reaction.

The present invention is further illustrated by the following example without, in any way, limiting it thereto.

*Example*

40 kilograms of cyanogen chloride are hourly reacted at 280 to 300° C. in a reaction tube which is 1.6 meters high and has a diameter of 200 millimeters, the said tube being filled to three-quarters of its capacity. Correspondingly, 40 kilograms of reaction product are removed hourly from the tube by way of an intermediate vessel, which has a capacity of 10 liters. In this intermediate vessel, the product is cooled to 190° C. and expanded. After the by-products which are concurrently formed have been separated out by sublimation, there were obtained 38.9 kilograms of pure cyanuric chloride per hour, corresponding to a yield of 97% of the theoretical.

We claim:

1. Process for the production of cyanuric chloride by polymerization of cyanogen chloride, which comprises maintaining cyanogen chloride in a body of catalyst-free cyanuric chloride at a temperature in excess of 200° C. to thereby polymerize cyanogen chloride to cyanuric chloride and recovering the cyanuric chloride formed.

2. Process according to claim 1, in which said polymerization is effected at a temperature within the range of 250°–400° C.

3. Process according to claim 1, in which the cyanuric chloride formed is initially cooled under pressure and thereafter allowed to expand.

4. Process according to claim 1, in which said cyanogen chloride is intimately mixed with liquid cyanuric chloride.

5. Process for the continuous production of cyanuric chloride by polymerization of cyanogen chloride, which comprises maintaining a catalyst-free mass of liquid cyanuric chloride at a temperature in excess of 200° C., substantially continuously introducing cyanogen chloride into said mass and substantially continuously removing excess cyanuric chloride formed.

6. Process according to claim 5, in which said liquid mass of cyanuric chloride is maintained at a temperature of between 250° and 400° C.

7. Process according to claim 5, in which said cyanogen chloride is introduced with intimate mixing with the liquid cyanuric chloride.

8. Process according to claim 5, in which the cyanuric chloride formed is initially cooled under pressure and thereafter allowed to expand.

References Cited in the file of this patent

UNITED STATES PATENTS

| | | |
|---|---|---|
| 2,414,655 | Metcalfe | Jan. 21, 1947 |
| 2,491,459 | Thurston | Dec. 13, 1949 |

FOREIGN PATENTS

| | | |
|---|---|---|
| 912,220 | Germany | May 28, 1954 |
| 945,239 | Germany | July 5, 1956 |